Jan. 4, 1966     F. J. BRADFORD ETAL     3,226,916
MUD TREATING APPARATUS
Filed March 4, 1963     3 Sheets-Sheet 1
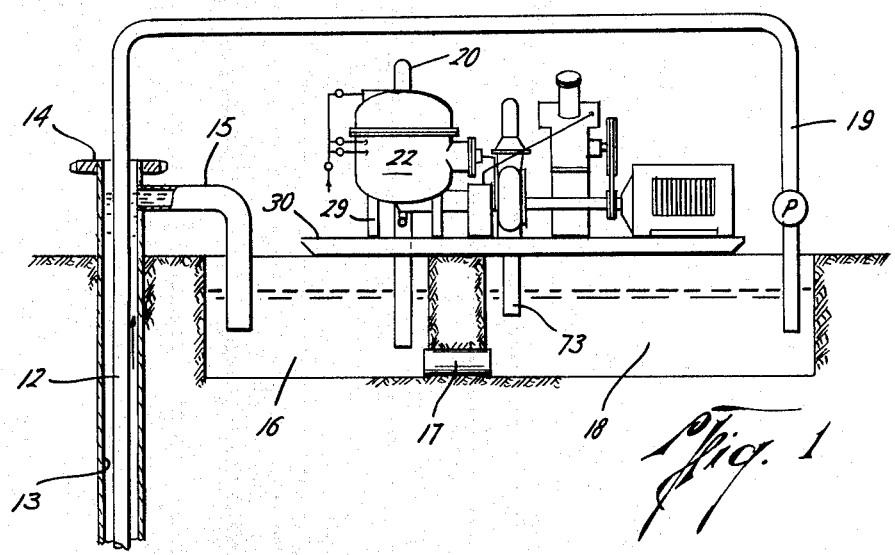
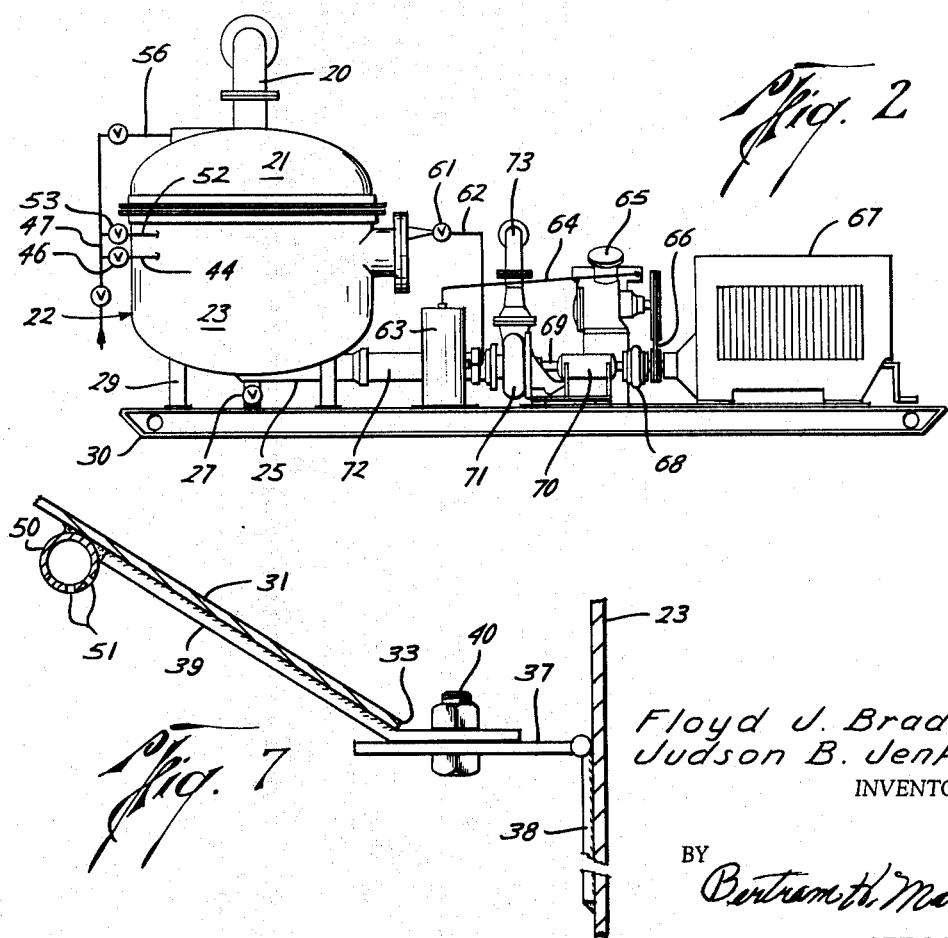
Floyd J. Bradford
Judson B. Jenkins
INVENTORS
BY Bertram H. Mann
ATTORNEY Jan. 4, 1966 F. J. BRADFORD ETAL 3,226,916
MUD TREATING APPARATUS
Filed March 4, 1963 3 Sheets-Sheet 2
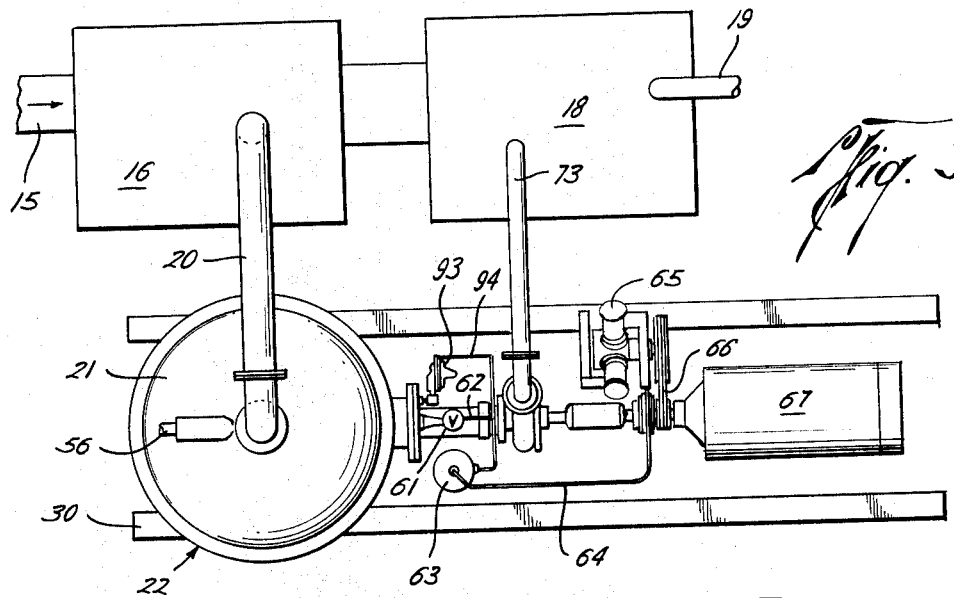
Fig. 3
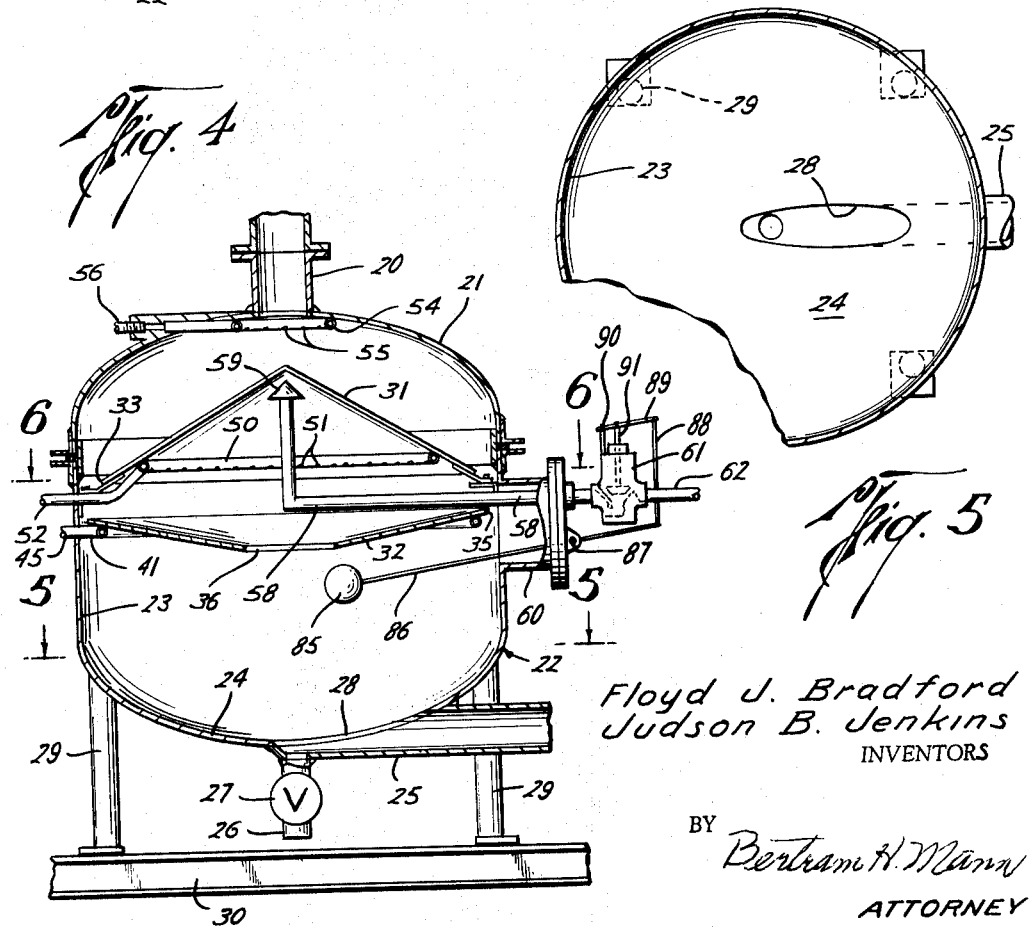
Fig. 4
Fig. 5
Floyd J. Bradford
Judson B. Jenkins
INVENTORS
BY Bertram H. Mann
ATTORNEY

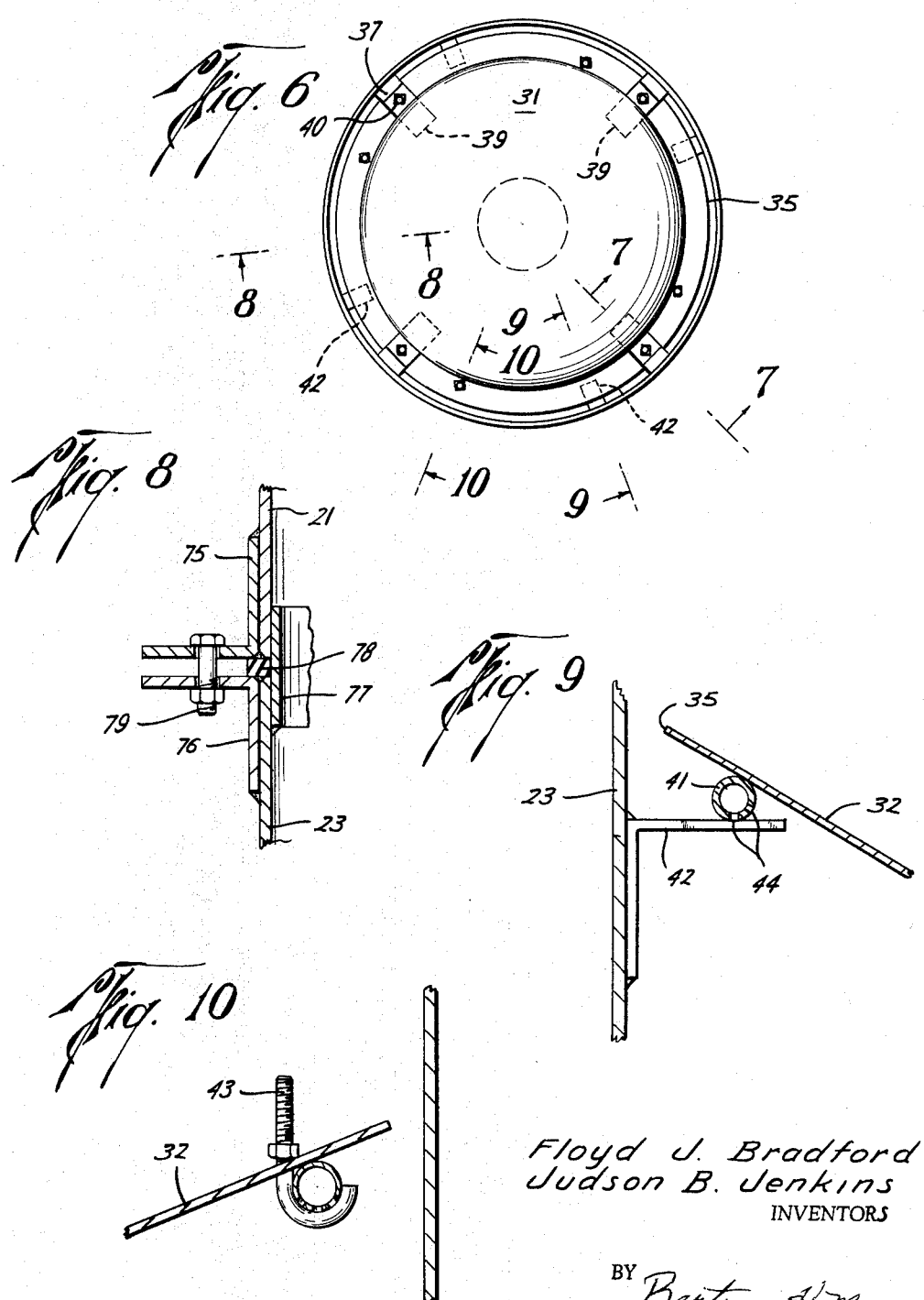

United States Patent Office 3,226,916
Patented Jan. 4, 1966

3,226,916
MUD TREATING APPARATUS
Floyd J. Bradford, 1079 Rocky River, and Judson B. Jenkins, 6733 Thornwall, both of Houston, Tex.
Filed Mar. 4, 1963, Ser. No. 262,762
3 Claims. (Cl. 55—193)

This invention relates to means for treating mud discharged from a well during drilling thereof and consists particularly in novel means for extracting gas from the mud and otherwise treating the mud as by mixing a suitable fluid therewith.

Previous mud treating vessels, particularly of the type in which a volume of gas cut or otherwise contaminated mud is collected in the vessel and there subjected to reduced pressure or other fluid treatment, have not been readily accessible internally for inspecting, testing and repairing the treating equipment. Moreover, installation and removal of the internal equipment has not been convenient particularly in making repairs in the field. Another disadvantage in previous mud treating systems is that pockets in the flow path tend to trap solids so that frequent cleaning is necessary. Such a mud treating system should be as free flowing as possible to minimize the accumulation of solids. Also, provision should be made for treating substantially all of the mud returned from the well. Nevertheless, the means should be provided for accommodating the returned mud notwithstanding malfunctioning of the treating vessel.

Accordingly, an object of the present invention is to provide a mud treating vessel having mud dispersing baffles therein and various treating pipes and also having novel means facilitataing access to such baffling and piping for inspecting, testing, removing and reinstalling such equipment.

Another object is to provide a mud treating system which is free of pockets and back washes where solids may accumulate.

Another object is to provide a mud treating system having mud pumping means which operates independently of and therefore does not affect the mud circulation system provided as part of the usual rotary drilling equipment.

These objects and others hereafter appearing are attained in the structure herein disclosed and claimed which consists, in general, of a treating vessel having an intake pipe at the top thereof which receives contaminated mud from the well. The mud is directed over a baffle system and, at the same time, is exposed to reduced pressure as well as treating fluids, if desired, for instance, to correct or alter the characteristics of the returned mud, then flows through a discharge pipe from a sump at the bottom of the tank to another part of the mud return conduit. Vertically spaced baffles are mounted within the vessel in such a way that either can be removed for inspecting, repairing, cleaning, and/or testing the other and the treating pipes are supported by the baffles in a novel manner.

In the accompanying drawings,

FIG. 1 is a schematic elevation of the novel treating apparatus;

FIG. 2 is an enlarged elevation illustrating the treating parts of the system;

FIG. 3 is a top view of the apparatuss shown in FIG. 2;

FIG. 4 is an enlarged vertical center section through the treating vessel;

FIG. 5 is a horizontal section taken substantially on line 5—5 of FIG. 4;

FIG. 6 is a horizontal section taken substantially on line 6—6 of FIG. 4;

FIG. 7 is a detail section taken substantially on line 7—7 of FIG. 6;

FIG. 8 is a detail vertical section taken substantially on line 8—8 of FIG. 6;

FIG. 9 is a detail vertical section taken substantially on line 9—9 of FIG. 6; and FIG. 10 is a detail vertical section taken on line 10—10 of FIG. 6.

FIG. 1 shows schematically a drill pipe 12 extending downwardly into the casing 13 of an oil well and provided with the rotary operating mechanism symbolized by the bevel gear 14, the usual kelly, swivel, and other parts of the rig being omitted for simplicity. The well annulus about the drill pipe or string communicates through a conduit 15 with a trough or tank 16 which communicates downstream through a duct 17 with a second tank or trough part 18. A pipe 19 feeds the treated main mud, under the influence of mud pump means P, to the usual swivel (not shown) at the top of the drill string whence the mud circulates downwardly through the drill string and the cutter tool at the bottom thereof and then upwardly through the well annulus and to conduit 15. As is well known, the returned mud is contaminated by cuttings as well as water, gas and/or other foreign substances accumulated during the transit through the well. The cleaned or treated mud forced downwardly through the drill string serves its usual functions of lubricating the cutters, carrying cuttings to the surface, and caking the bore wall to prevent caving and also to seal in formation fluids, and provides a fluid head in the well which resists the discharge into the well of highly pressured formation fluids. Because of the latter function, it is important that the returned, contaminated mud be freed of gas which may be dissolved or mixed therewith since the presence of such gas in excess quantities lightens the fluid head in the well annulus with resultant danger of a blow-out. Various means may be provided for separating cuttings and other contaminating solids and liquids.

The apparatus herein disclosed and claimed is designed to effectively de-gas and otherwise treat the returned drilling mud. Leading from first tank or trough portion 16 is an inlet pipe 20 which extends through the separately formed, upwardly dished top wall 21 of a closed treating vessel, generally designated 22. The vessel also includes a cylindrical side wall 23 and a downwardly dished bottom wall 24 (FIG. 4) from the central, lowest, sump forming part of which there extends the discharge pipe 25. A drain spout 26 branching from pipe 25 is provided with a control valve 27. The bottom wall or floor 24 of the vessel is provided with a radially elongated aperture 28 (FIG. 5) through which liquid in vessel 22 may drain into pipe 25. The vessel is supported by means of legs 29 upon skids 30 but, of course, may be supported in any suitable manner and in any convenient relationship vertically or horizontally with respect to tanks or trough portions 16 and 18. Elongated outlet aperture 28 tends to prevent cavitation of liquids being discharged from the vessel.

Mounted within the vessel are upper and lower baffle structures 31 and 32, both of a generally conical construction. The upper baffle structure has its outer periphery 33 spaced from the vessel side wall 23, as indicated in FIGS. 4, 6 and 7, whereby fluids entering through intake pipe 20 flow in thin layers downwardly and outwardly along baffling 31, thence drop through the annulus therearound upon lower baffle structure 32. The outer edge 35 of the lower baffling (FIGS. 4, 6 and 9) is closer to vessel side wall 23 than the upper baffling for catching the downflowing mud. A central orifice 36 in the lower baffling conducts the mud stream into the bottom part of the vessel whence it is discharged through outlet means 28, 25.

As best shown in FIG. 7, the upper baffle structure 31 is supported upon brackets 37 hinged to plate 38 secured at regular intervals to the inner face of side wall 23, as by welding, and obtusely angled straps 39 welded to and projecting outwardly and upwardly beyond the periphery of baffle structure 31. These straps are detachably secured by bolts 40 to hinged brackets 37. Lower baffle structure 32 is supported near its outer edge upon annular treating pipe 41 (FIG. 9) which, in turn, rests upon right angle brackets 42 firmly secured to the inner face of vessel side wall 23, as by welding. Between brackets 42, annular pipe 41 is supported from baffling 32 by means of hook bolts 43. Pipe 41 is provided with generally downwardly facing perforations 44 for a purpose to be described, and connected by tubing 45, in which there is installed a valve 46, with a treating pipe 47 (FIG. 2).

A second annular treating pipe 50, having downwardly facing perforations 51, is secured, as by welding, to the under surface of upper baffle structure 31 and is connected by tubing 52, having a valve 53, to treating pipe 47. As indicated by FIG. 7, annular pipe 50 is secured to baffling 31 substantially at the edge of mounting straps 39. A third treating pipe ring 54, having downwardly facing perforations 55, is secured to the top wall 21 around the mouth of inlet pipe 20 and is connected by tubing 56 to the treating pipe 47. Treating pipes 41, 50 and 54 may be used for injecting wash water into the vessel for cleaning out accumulated mud or for injecting any desired fluid into the vessel for otherwise treating the vessel or the mud, for instance, to change or renew the characteristics of the mud. If desired, these treating pipes may lead to separate fluid sources.

Also extending into the vessel is a suction pipe 58 having a terminal portion 59 in a shielded position beneath the apex of upper baffle structure 31. The suction pipe extends outwardly through a flanged fitting 60 and through a valve casing 61 and pipe section 62 to a vacuum reservoir 63. This reservoir, in turn, is connected by piping 64 to a vacuum pump 65 provided with a belt or chain drive connection 66 to a suitable prime mover 67. The prime mover is also connected by a coupling 68 and drive shaft 69, extending through a shaft guide and support 70, to a treating pump 71. The inlet of the mud pump is connected by piping 72 to outlet pipe 25 leading from the extreme bottom of the treating vessel. The outlet of the mud pump is connected by piping 73 to a downstream portion of the mud tank or trough means 16, 17, 18, for delivering treated mud thereto to be picked up by main mud pump P for redelivery to the drill pipe, as previously explained.

The upwardly dished upper wall part 21 of the vessel has an outwardly turned angle bar 75 welded to the lower edge thereof (FIG. 8), and this angle bar and the lower edge of top wall 21 are supported upon a similar outwardly turned angle bar 76 and against an annular strip 77, both welded to the upper edge of side wall 23 of the main body part of the vessel. A sealing ring 78 of rubber or other suitable resilient material is interposed between the confronting edges of tank parts 23 and 21 and the angle brackets are secured together by bolts 79 to form a sealed lap joint between these parts. Upon detachment of mud inlet pipe 20 and bolts 79, the entire vessel upper wall may be removed to permit installation, inspection, testing or removal of baffle structures 33 and 32. When upper baffle structure 31 is removed, upon removal of bolts 40, its hinged support brackets 37 will drop to positions substantially flush with the inner face of the tank wall 23 to permit bottom baffle structure 33 to be inserted or removed therepast.

The level of mud in the treating vessel will be controlled by a float 85 at the end of an arm 86 which is pivoted at 87 to lugs 88 on flanged control mounting 60. The arm is connected by adjustable linkage 88 to one end of a lever 89 pivoted at its opposite end, as at 90, to the body of valve 61. A valve actuating stem 91 extends from lever 89 to the valve for controlling suction pipe 58, 62. A bleed valve 93 (FIG. 3) is also provided on mount 60 and the control side thereof is connected by piping 94 to reservoir 63.

In operation, the vessel and other equipment on the skid mount will be located in any convenient level and spacing with respect to the mud trough or tanks which receive contaminated mud returned from the well. The treating system mud pump 71 preferably will be of adequate capacity, under normal conditions, to suck all of the mud returned from the well into the treating apparatus. However, if for any reason, for instance, clogging of the vessel or improper functioning of pump 71, all of the returned mud is not drawn into the treating system, such mud will pass directly, as through tank connection or trough part 17 to the downstream tank or trough part 18. The contaminated mud entering vessel 22 through intake pipe 20 will drop onto upper baffle structure 31 and flow downwardly and outwardly therealong in a thin sheet, then will drop onto the outer edge of lower baffle structure 32 and continue its downward flowing in a reverse direction to bottom opening 36.

Ultimately, the mud will drop into the bottom part of the tank and the level of mud accumulated therein will be sensed by float 85 so that when the mud reaches a predetermined level, valve 61 will be closed in order to cut off the suction system from the vessel. Suction control bleed valve 93 will prevent excessive reduction of pressure in the upper part of the vessel, in other words, will maintain adequate pressure in the vessel to permit treating mud pump 71 to draw mud from the bottom thereof. The resultant reduced pressure in the upper part of the vessel will be applied to the thin mud stream traversing the baffle structures, as well as mud accumulated in the bottom of the vessel, for causing gases dissolved in or entrained with the mud to be released and ejected outwardly through the suction system. Treating pipes 41, 50 and 55 may be utilized, as previously explained, for injecting a mud treating liquid, for instance, water, into the vessel for thinning the returned mud or for otherwise changing or renewing its characteristics. Also, these treating pipes may be used in cleaning out solids which may accumulate in the vessel. The treating pipes are judiciously located for both purposes.

If access to the interior of the vessel is desired for any reason, release of bolts 79 and detachment of pipes 20 and 56 will permit the top 21 to be bodily lifted clear of the remainder of the vessel, exposing the internal workings. Baffle structure 31 may be removed upwardly upon release of bolts 40. Then the exposed lower baffling 32 may be inspected, repaired, tested, cleaned, or removed past collapsed hinge brackets 37. In the latter case, the bottom of the vessel will be exposed for inspection and treatment. The parts may be reassembled in the reverse order to prepare the apparatus for further use.

An important advantage of the present equipment is the relative ease of assembly and disassembly. Another important advantage is the continuous flow path of the entire volume of well fluid during the treating process. The elimination of pockets results in longer periods of use between cleanings.

The invention may be modified in various respects as will occur to those skilled in the art, and exclusive use of all modifications as come within the scope of the appended claims is contemplated.

We claim:

1. The combination with a drilling mud system for a well including a return duct for receiving contaminated mud returned from the well, a clean mud tank, a conduit connecting said duct and said tank, a mud supply duct connecting said tank and the well, and main mud pump means in said supply duct for forcing mud from said tank into the well, of mud treating means comprising a mud treating vessel adjacent said conduit, mud degassing means in said vessel, an intake pipe leading from a first part of said conduit into said vessel, a discharge pipe connecting said vessel with said clean mud tank, and treating pump means with its inlet and discharge wholly supplied from said discharge pipe for circulating mud from said conduit first part through said treating vessel and thence to said clean mud tank for causing degassing of the contaminated mud returned from the well independently of said main mud pump means.

2. The combination with a drilling mud system for a well including a return duct for receiving contaminated mud returned from the well, a clean mud tank, a conduit connecting said duct and said tank, a clean mud supply duct connecting said tank and the well, and main mud pump means in said supply duct for circulating mud from said tank into said well and to said return duct, of an independently operating mud treating unit comprising a mud treating vessel adjacent said conduit, mud degassing and treating means in said vessel, an intake pipe leading from a first part of said conduit into said vessel and a discharge pipe connecting said vessel with said clean mud tank, and a treating pump in said discharge pipe independent of said mean mud pump means and with its inlet and discharge supplied wholly from said discharge pipe upstream of said clean mud tank, said treating pump being of sufficient capacity for normally causing circulation of substantially all the contaminated mud in said conduit first part through said treating vessel and thence into said discharge pipe and said clean mud tank.

3. The combination with a drilling mud system including a return duct for receiving contaminated mud returned from the well, a clean mud tank, a mud supply duct connecting said tank and the well, and main mud pump means in said supply duct, of mud treating means comprising a contaminated mud tank for receiving mud from said return duct, a degasser vessel adjacent said contaminated mud tank, a restricted connection between said tanks, inlet and discharge pipes connecting said vessel, respectively, to said contaminated and clean mud tanks, and a treating pump in said discharge pipe, the inlet and discharge of said treating pump being wholly supplied directly from said treating vessel and said treating pump being of sufficient capacity to draw through said vessel at least the normal mud flow volume supplied by said main mud pump means, said restricted connection permitting flow of mud directly between said tanks in either direction in case, respectively, of reduced or excessive circulation of mud through said vessel.

References Cited by the Examiner
UNITED STATES PATENTS

| | | | |
|---|---|---|---|
| 1,910,088 | 5/1933 | Cherry | 55—165 |
| 2,041,059 | 5/1936 | French | 55—193 |
| 2,231,341 | 2/1941 | Lichte | 55—182 |
| 2,364,119 | 12/1944 | Anderson | 55—182 |
| 2,748,884 | 6/1956 | Erwin | 55—193 |
| 2,852,091 | 6/1958 | Boudreaus et al. | 55—204 |
| 2,962,114 | 11/1960 | Medearis | 55—190 |
| 2,998,096 | 8/1961 | Snipes | 55—166 |

REUBEN FRIEDMAN, *Primary Examiner.*

B. NOZICK, J. W. ADEE, *Assistant Examiners.*

PO-1050
(5/69)

UNITED STATES PATENT OFFICE
CERTIFICATE OF CORRECTION

Patent No. 3,226,916          Dated January 4, 1966

Inventor(s) Floyd J. Bradford and Judson B. Jenkins

It is certified that error appears in the above-identified patent and that said Letters Patent are hereby corrected as shown below:

In Column 1, line 62, please delete "apparatuss" and insert therefor -- apparatus --.

In Column 5, line 18, please delete "mean" and insert therefor -- main --.

Signed and sealed this 23rd day of April 1974.

(SEAL)
Attest:

EDWARD M. FLETCHER, JR.
Attesting Officer

C. MARSHALL DANN
Commissioner of Patents